US008491369B2

(12) United States Patent
Kowell

(10) Patent No.: US 8,491,369 B2
(45) Date of Patent: Jul. 23, 2013

(54) METHOD AND APPARATUS FOR PLAYING A SKILL GAME

(76) Inventor: Grant F. Kowell, Canton, OH (US)

( * ) Notice: Subject to any disclaimer, the term of this patent is extended or adjusted under 35 U.S.C. 154(b) by 1072 days.

(21) Appl. No.: 11/696,185

(22) Filed: Apr. 3, 2007

(65) Prior Publication Data

US 2007/0238503 A1 Oct. 11, 2007

Related U.S. Application Data

(60) Provisional application No. 60/789,684, filed on Apr. 5, 2006, provisional application No. 60/813,786, filed on Jun. 14, 2006, provisional application No. 60/815,352, filed on Jun. 21, 2006.

(51) Int. Cl.
*A63F 13/00* (2006.01)

(52) U.S. Cl.
USPC ............................................... 463/13; 463/16

(58) Field of Classification Search
USPC .................................... 463/25, 29, 1–20, 293
See application file for complete search history.

(56) References Cited

U.S. PATENT DOCUMENTS

| | | | | |
|---|---|---|---|---|
| 4,040,985 | A | 8/1977 | Shidara et al. | |
| 4,375,286 | A | 3/1983 | Seitz et al. | |
| 4,743,024 | A | 5/1988 | Helm et al. | |
| 5,393,057 | A | 2/1995 | Marnell, II | |
| 5,409,225 | A | 4/1995 | Kelly et al. | |
| 5,411,268 | A | 5/1995 | Nelson | |
| 5,513,850 | A | 5/1996 | Vancura | |
| 5,566,946 | A | 10/1996 | Parker | |
| 5,603,502 | A | 2/1997 | Nakagawa | |
| 5,607,162 | A | 3/1997 | Boylan et al. | |
| 5,718,429 | A | 2/1998 | Keller, Jr. | |
| 5,961,384 | A | 10/1999 | Robinson | |
| 6,028,604 | A | 2/2000 | Matthews et al. | |
| 6,123,335 | A | 9/2000 | Adkins | |
| 6,165,069 | A | 12/2000 | Sines et al. | |
| 6,174,237 | B1 | 1/2001 | Stephenson | |
| 6,254,478 | B1 | 7/2001 | Namanny | |
| 6,390,473 | B1 | 5/2002 | Vancura | |
| 6,394,899 | B1 | 5/2002 | Walker | |
| 6,413,160 | B1 | 7/2002 | Vancura | |
| 6,435,511 | B1 | 8/2002 | Vancura | |
| 6,481,717 | B1 * | 11/2002 | Richardelle | 273/292 |

(Continued)

OTHER PUBLICATIONS

U.S. Appl. No. 60/788,363; Michael R. Pace; filed Mar. 31, 2006.

(Continued)

*Primary Examiner* — David L Lewis
*Assistant Examiner* — Eric M Thomas
(74) *Attorney, Agent, or Firm* — Zollinger & Burleson Ltd.

(57) ABSTRACT

A skill game rewards a player after a round of play only upon the entry of a "correct play" that is based on the rules of the game being played. A "correct play" is determined under the rules of the particular game being played and is one that gives the player a better chance to obtain the outcome desired by the player. In some games, the "correct play" is defined mathematically. In other games, the "correct play" is determined by knowing the rules of the game being played. A combination of both methods is typical. The execution by the player of a correct play is a skill. If the player enters the correct play, the player is rewarded. The reward may be to continue the play of the game and to reward a prize to the player based on the outcome of the game.

19 Claims, 2 Drawing Sheets

U.S. PATENT DOCUMENTS

| | | | | |
|---|---|---|---|---|
| 6,488,580 | B1 | 12/2002 | Robb | |
| 6,554,283 | B2 | 4/2003 | Vancura | |
| 6,604,740 | B1 | 8/2003 | Singer et al. | |
| 6,604,996 | B1 | 8/2003 | Namanny | |
| 6,645,069 | B2 | 11/2003 | Robb | |
| 6,648,758 | B2 | 11/2003 | Bennett et al. | |
| 6,692,005 | B2 | 2/2004 | Vancura | |
| 6,752,717 | B2 | 6/2004 | Vancura | |
| 6,764,397 | B1 | 7/2004 | Robb | |
| 6,884,167 | B2 | 4/2005 | Walker | |
| 6,988,732 | B2 | 1/2006 | Vancura | |
| 7,040,985 | B2 | 5/2006 | Vancura | |
| 7,073,793 | B2 | 7/2006 | Vancura | |
| 7,736,223 | B2 | 6/2010 | Pace | |
| 2003/0013514 | A1 * | 1/2003 | Cregan et al. | 463/20 |
| 2003/0090063 | A1 * | 5/2003 | Jarvis et al. | 273/292 |
| 2003/0109310 | A1 * | 6/2003 | Heaton et al. | 463/42 |
| 2005/0003883 | A1 | 1/2005 | Muir et al. | |
| 2005/0181851 | A1 * | 8/2005 | Amaitis et al. | 463/12 |
| 2005/0202385 | A1 | 9/2005 | Coward et al. | |
| 2007/0232384 | A1 | 10/2007 | Pace | |
| 2007/0232385 | A1 | 10/2007 | Pace | |

OTHER PUBLICATIONS

USPTO Office Action, Dec. 4, 2008, in U.S. Appl. No. 11/428,026.

USPTO Office Action, Oct. 26, 2009, in U.S. Appl. No. 11/428,026.

USPTO Advisory Office Action, Feb. 17, 2010, in U.S. Appl. No. 11/428,026.

USPTO Notice of Allowance and Examiner's Amendment, Apr. 16, 2010, in U.S. Appl. No. 11/428,026.

Womble, Carlyle, Sandridge & Rice letter dated Mar. 14, 2011 with attachments A (2 pages) and B (3 pages).

Turner, "Tic-Tac-Fruit: An Analysis," Nov. 15, 2004.

Farley, "Report on the Review and Analysis of the Tic-Tac-Fruit Game," Letter to Kurt O. Gearhiser, Esq., Mar. 7, 2005.

* cited by examiner

| Your hand | Dealer's face-up card | | | | | | | | | |
|---|---|---|---|---|---|---|---|---|---|---|
| | 2 | 3 | 4 | 5 | 6 | 7 | 8 | 9 | 10 | A |
| **Hard totals** | | | | | | | | | | |
| **17-20** | S | S | S | S | S | S | S | S | S | S |
| **13-16** | S | S | S | S | S | H | H | H | H | H |
| **12** | H | H | S | S | S | H | H | H | H | H |
| **11** | D | D | D | D | D | D | D | D | D | D |
| **10** | D | D | D | D | D | D | D | D | H | H |
| **9** | H | D | D | D | D | H | H | H | H | H |
| **5-8** | H | H | H | H | H | H | H | H | H | H |
| **Soft totals** | | | | | | | | | | |
| | 2 | 3 | 4 | 5 | 6 | 7 | 8 | 9 | 10 | A |
| **A,9** | S | S | S | S | S | S | S | S | S | S |
| **A,8** | S | S | S | S | D | S | S | S | S | S |
| **A,7** | D | D | D | D | D | S | S | H | H | H |
| **A,6** | H | D | D | D | D | H | H | H | H | H |
| **A,4 A,5** | H | H | D | D | D | H | H | H | H | H |
| **A,2 A,3** | H | H | H | D | D | H | H | H | H | H |
| **Pairs** | | | | | | | | | | |
| | 2 | 3 | 4 | 5 | 6 | 7 | 8 | 9 | 10 | A |
| **A,A** | SP | SP | SP | SP | SP | SP | SP | SP | SP | SP |
| **10,10** | S | S | S | S | S | S | S | S | S | S |
| **9,9** | SP | SP | SP | SP | SP | S | SP | SP | S | S |
| **8,8** | SP | SP | SP | SP | SP | SP | SP | SP | SP | SP |
| **7,7** | SP | SP | SP | SP | SP | SP | H | H | H | H |
| **6,6** | SP | SP | SP | SP | SP | H | H | H | H | H |
| **5,5** | D | D | D | D | D | D | D | D | H | H |
| **4,4** | H | H | H | SP | SP | H | H | H | H | H |
| **2,2 3,3** | SP | SP | SP | SP | SP | SP | H | H | H | H |

FIG. 3

Key: S = Stand; H = Hit; D = Double; and SP = Split

METHOD AND APPARATUS FOR PLAYING A SKILL GAME

CROSS REFERENCE TO RELATED APPLICATIONS

This application claims the benefit of U.S. Provisional Application No. 60/789,684, filed Apr. 5, 2006, and also claims the benefit of U.S. Provisional Application No. 60/813,786, filed Jun. 14, 2006, and further claims the benefit of U.S. Provisional Application No. 60/815,352, filed Jun. 21, 2006. The disclosures of these applications are incorporated herein by reference.

BACKGROUND OF THE INVENTION

1. Technical Field

The present invention generally relates to amusement devices. More particularly, the invention relates to an amusement device and a method for conducting a game wherein the player must properly demonstrate a skill in order to advance to a subsequent round of play. The determination of whether the player has properly demonstrated the skill is determined by the statistically correct play.

2. Background Information

Many people are entertained by the excitement of games such as blackjack, poker, backgammon, and other such games where the player must make a decision during the game that influence the outcome of the game. Although one part of the appeal of these games is the possibility of winning a prize, another part of the appeal of these games is the pleasure one derives from playing the act of playing the games as evidenced by the numerous people who play them for fun. Many games, such as blackjack, baccarat, poker, backgammon, and the like, have rules and numerical odds that define the next best play for any player. The player has the best chance at a favorable outcome if he plays by these odds. When playing for fun or for stakes, most players will, however, gamble—or play by "instinct"—even if they logically know that such play increases the likelihood they will fail over time. Although this type of play can lend fun to the game and increase enjoyment, it significantly decreases the player's ability to win the game over time.

Many local governments use gambling laws to restrict the play of casino games for stakes. Commonly, a casino game may be played for the entertainment that the game itself provides, but play of such games is prohibited when coupled with stakes. Under many gambling laws, however, it is permissible to award a cash prize to a winner of a game requiring skill, such as a basketball free-throw shooting contest, a pool shooting contest, or a dart throwing contest. Similarly, many local governments permit a cash prize to be awarded to a winner of a game requiring mental skill, such as a trivia contest. Thus, it appears that it is not the award of cash prizes that most local communities find needs to be restricted, but rather the potential for abuse when a cash prize is awarded for success in a game of chance.

As the success of numerous casinos indicates, entertainments that combine the games with the excitement of cash prizes are of great entertainment value to many people. The problem has been to develop a form of entertainment that combines both types of excitement while protecting the concerns of local governments by refraining from the award of cash prizes for success in a game of chance.

SUMMARY OF THE INVENTION

The invention provides a game wherein the player is only rewarded after a round of play upon the entry of a "correct play" that is based on the rules of the game being played. A "correct play" is determined under the rules of the particular game being played and is one that gives the player a better chance to obtain the outcome desired by the player. In some games, the "correct play" is defined mathematically. In other games, the "correct play" is determined by knowing the rules of the game being played. A combination of both methods is typical. The execution by the player of a correct play is a skill. If the player enters the correct play, the player is rewarded.

In one configuration of the invention, once the player has executed a correct play, the player may be rewarded by being allowed to participate in an additional round of play where the game proceeds until an outcome is achieved. The only way the player will reach the end of the game is to continue to make correct plays. In another configuration of the invention, the player, after executing a correct play, participates in a bonus round where a prize is awarded to the player based on some mechanism that may include chance.

The invention provides a game machine that allows players to play games according to the method of the invention. The machines may be designed to instantly award the prizes to the players.

In another configuration of the invention, the game includes a timer that stops the game if the player does not answer the play decision within a set period of time. The time limit discourages the player from using outside sources to obtain the answers to the play decision.

The invention also provides a configuration wherein the player may preview the game to be played. In this configuration, the player may evaluate if he wishes to play the game by pressing a preview button that shows the player the first step of the game to be played as well as the prize that he will be playing for. If the player decides he wishes to play the game as a result of the evaluation, the player will initiate the game.

BRIEF DESCRIPTION OF THE DRAWINGS

FIG. 3 is a chart of the correct plays for an exemplary blackjack game.

DETAILED DESCRIPTION OF THE INVENTION

The apparatus and method of the present invention may be based on any game having at least one round of play wherein the player must make a play decision and a definable correct play (such as a statistically correct play or a play that is correct in accordance with the rules of the game) exists for each play decision. The definable correct play identifies which play gives the player a better chance of winning. Such games include a variety of card games (poker, blackjack, baccarat), dice games, and games traditionally associated with gambling such as backgammon and cribbage. A play in one of these games may be any of the actions that a player normally makes while playing the game—such as moving a playing piece, discarding cards, requesting additional cards, laying down a particular card or cards, and the like. One configuration of the invention involves only a single play chance for the player. Two exemplary games that play well with a single play chance are blackjack and draw poker. If the player makes the correct play, then the player is rewarded by proceeding to a bonus or reward round. If the player makes an incorrect play, the game ends. In another configuration of the invention, the player continues playing the game to the conclusion of the game as long as he executes correct game plays.

The invention may be applied to any game that has at least one round of play requiring a decision from the player wherein statistics define the correct play. The method rewards the player when the player makes the correct game play and punishes the player by ending the game when the player makes an incorrect play. The skill of this game is to play the game in a way that gives the player the best chance—under previously defined statistics or game rules—to win. If the player makes a play that is not favored by the statistics or allowed by the game rules, then the game is over and the player must start again. When the player succeeds in making the correct play, the player may continue playing the game's next step or continue playing the game to its conclusion with the outcome of the game deciding the prize awarded to the player. In another embodiment, the player proceeds to play a bonus round where a prize is awarded by some random manner (such as a completely random selection, a spinning wheel-type round where the player pushes a button to stop on a prize, or the like). The game may reward the player for each correct play.

Figure 1:
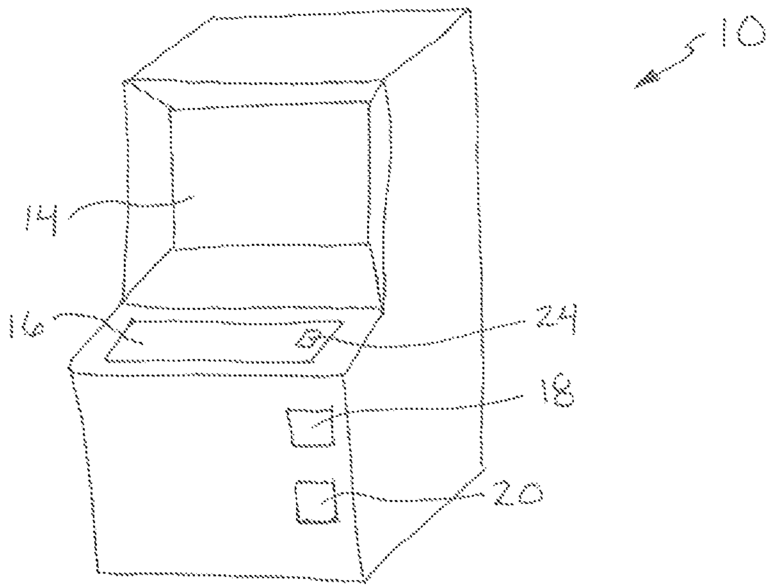
FIG. 1 depicts an exemplary game machine.
Figure 2:
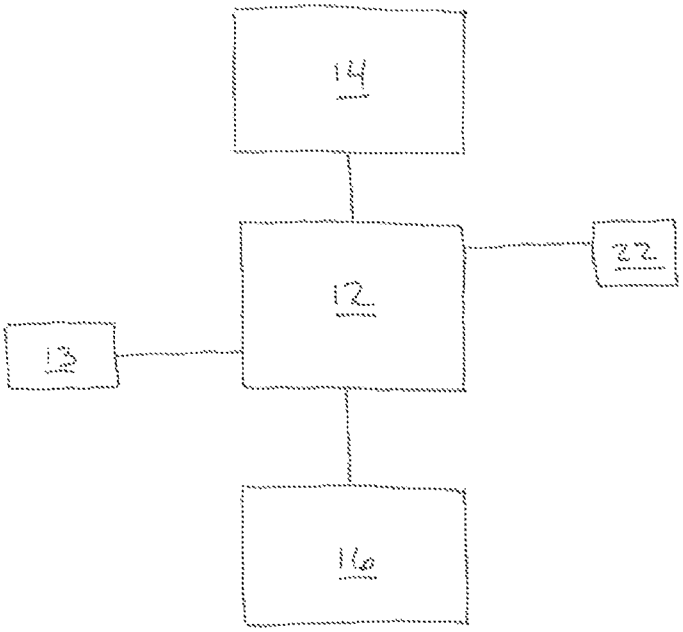
FIG. 2 is a schematic of the elements of the game machine.

FIG. 1 depicts an exemplary gaming machine 10 that uses a computer or controller having a processor 12 and a memory device 13 (RAM and ROM) to govern the method of the invention. The computer or controller also includes processors that control the input devices and the output devices described below. Processor 12 may be a microprocessor or microcontroller-based device that is capable of displaying graphics. Memory device 13 includes random access memory (RAM) for storing event data or other data generated or used during a particular game. Memory device 13 also includes read only memory (ROM) for storing program code, which controls machine 10 so that it plays a particular game in accordance with applicable game rules and pay tables. The player may interact with machine 10 directly or through a computer network when machine 10 conducting the game is located a remote location. Machine 10 may include an output device 14 (a viewable screen or screens or a audio speaker) to inform the player of the game status (the deal of the cards; the roll of the dice) or the game rules. Machine 10 also includes an input device 16 (keyboard; touch screen; microphone; input buttons; joystick; trackball; mouse wheel) to allow the player to communicate his play decisions to processor 12. An appropriately programmed computer processor 12 runs the game. The money used to play the game may be deposited directly into a payment acceptor 18. Acceptor 18 may be configured to receive one or more of cash, chips, or electronic transfer (debit card, credit card, prepaid cash card). Payment may also be made through input device 16 by entering data such a card number (or a bank account number) and creating an electronic funds transfer over a computer network. Prizes awarded by the machine may be delivered through a payout tray 20 or credited back to the player in the manner the funds were paid—such as by crediting the player's credit card or the like. Machine 10 may also keep track of the player's payments and awards and provide a single payment transaction when the player chooses to end a series of games.

The game may include a timer 22 that gives the player a fixed amount of time to enter his play. Timer 22 may be used to limit the player's ability to look up his answers—or plays—from an outside source such as an odds book or a rule book. If the player does not enter his play within the set time period, timer 22 will register a loss and reset the game. Timer 22 also may be used to reset the game if a player walks away from the game in the middle of a game.

The game may also include an optional preview button 24 that allows the player to learn the first step of the game that will be played next. The preview may also tell the player how much the prize will be if the player plays the game, makes the correct plays, and wins the game. For example, preview button 24 may be used to reveal the initial card deal, dice roll, or game set up as well as the prize that will be awarded if the player participates and wins.

Game machine 10 may be programmed with a plurality of different games and different variations of the same game. For example, a plurality of different blackjack games may be provided to the player. The player initially starts the game by selecting the type and version of the game he desires to play. The machine allows the player to review the rules of the game at the player's option.

In order to provide an example of the invention, the method is applied to the game of blackjack. The rules and statistically correct plays of blackjack are commonly understood and are published in any of a variety of places. The strategy table of FIG. 3 is a basic strategy table for the most common 6- to 8-deck blackjack rules commonly played at large casinos in Las Vegas. These rules require the dealer to hit on soft 17, double after split allowed, multiple split aces, one card to split aces, and blackjack pays 3:2. Numerous other blackjack games are available with different strategy tables. For example, some games require the dealer to stand on soft 17; some games do not allow doubling after splits, etc. Strategy tables defining the correct plays for these games are available from a variety of known sources. The game of blackjack is generally played as follows. The player and dealer are dealt two cards with only one of the dealer's cards being visible to the player. The player must then decide whether to stand, hit, double, or split. When the timer discussed above is used, the player must enter his play within the set time period. Such a time period may be 5 seconds. The 5 second countdown may be communicated visually or audibly for the player. For a given set of games rules which are provided to the player, there is a statistically correct choice for every combination of cards as shown in FIG. 3. The method of the invention is designed to reward the player for making the statistically correct choice in the game. For example, if the player is dealt a pair of tens, the statistically correct choice for the player is to stand regardless of what the dealer is showing. Statistically incorrect choices would be to split the cards or to request a third card. If the player makes the statistically incorrect choice, the player loses and the game is over. This distinguishes this method from a typical game wherein the player can still win the game by making the statistically incorrect choice. In this example, the player with two tens may choose to receive a third card and may receive an ace for a total of twenty-one. Although this would be a good result in a casino environment, this method punishes the player for making a bad play by ending the game even though the player has achieved a score of twenty-one. When the player makes a statistically-incorrect choice, he is relying on chance. In the method of the present invention, the player is rewarded only if he makes the statistically-correct decision. This type of play requires skill. The method and apparatus of the invention may thus be used to teach a player the correct manner to play a game. When the preview option is used, the player may determine the initial deal of the cards before the player commits to playing the game. The preview would show the player that the initial deal will be a pair of tens and that the payout will be one dollar if the player makes the correct play. Having evaluated the initial deal and the potential payout, the player may elect to participate in the game.

When the player makes the correct play, the player may receive an instant award that is a percentage of the price of playing the game. The player may then participate in a bonus round that assigns a prize determined by some random or partially random manner. In one embodiment, the bonus prize may be completely randomly selected from a defined prize range based on the cost of playing the game. In another embodiment, the bonus prize is determined by continuing the game (the hand of blackjack in this example) to its conclusion. If the conclusion of the hand has the player winning, the player wins a prize—such as an amount the cost him top play the game. If the player loses the hand, the player may receive nothing.

Another exemplary game is a draw poker game. The player receives five initial cards and must make a decision about which cards to trade for new cards in order to improve his hand. Depending on the rules of the game, the correct play for each dealt hand of cards is definable. For example, when the initial hand provides the player with a four card straight with the fifth card matching one of the other cards to form a pair, there is a statistically correct play based on the game set up and the prizes associated with winning the straight compared with obtaining three of a kind.

This invention thus allows players to enjoy a wide variety of games by transforming the game rules into skill games that require the players to make correct decisions before having any chance at obtaining a prize.

The invention claimed is:

1. A method for operating a skill game, said method comprising the steps of:

(a) displaying an event in a game involving player skill on a display device;

the game having predefined rules and a plurality of potential game plays for the displayed event with at least one of the plurality being the statistically best game play decision for the event displayed;

(b) enabling a player to input a game play decision into the event involving skill using a player interface;

(c) determining if the game play decision input by the player is a statistically best game play decision, the determination based on the predefined rules for the displayed event; and (d) if the game play decision is a statistically best game play decision, then awarded awarding a prize to the player regardless of the outcome of the game play decision.

2. The method of claim 1, wherein step (d) further comprises the step of awarding the prize to the player immediately after the player inputs a statistically best game play decision.

3. The method of claim 1, further comprising the step of requiring the player to pay a fee to play the game.

4. The method of claim 1, further comprising limiting the time the player has to input the decision in step (b).

5. The method of claim 1, further comprising the step of allowing the player to preview the event that will be next played before the player elects to play the game by paying money.

6. A method for operating a skill game, said method comprising the steps of:

(a) displaying an event in a game involving player skill on a display device; the game having predefined rules and a plurality of potential game plays for the displayed event with at least one of the plurality being the statistically best game play decision for the event displayed;

(b) enabling a player to input a game play decision into the event involving skill using a player interface;

(c) determining if the game play decision input by the player is a statistically best game play decision, the determination based on the predefined rules for the displayed event;

(d) if the game play decision is a statistically best play decision, then continuing to play the event to the conclusion of the event to determine the prize awarded to the player; and (e) if the game play decision is not a statistically best game play decision, then ending the game.

7. The method of claim 6, further comprising the step of awarding a first prize to the player immediately after the player inputs a statistically best game play decision.

8. The method of claim 6, further comprising the step of requiring the player to pay a fee to play the game.

9. The method of claim 6, further comprising limiting the time the player has to input the decision in step (b).

10. The method of claim 6, further comprising the step of allowing the player to preview the event that will be next played before the player elects to play the game by paying money.

11. A method for operating a skill game, said method comprising the steps of:

(a) allowing a player to preview the next event that will be played in a game involving player skill before the player elects to play the game by paying money; the game having predefined rules and a plurality of potential game plays for the displayed event with at least one of the plurality being the statistically best game play decision for the event displayed;

(b) accepting a payment from the player after the player has previewed the next event that will be played;

(c) displaying the previewed event as the event to be played by the player; and (d) enabling a player to input a game play decision into the displayed event using a player interface.

12. The method of claim 11 further comprising the steps of determining if the game play decision input by the player is a statistically best game play decision, the determination based on the predefined rules for the displayed event; and ending the game if the game play decision is not a statistically best game play decision.

13. The method of claim 11 further comprising the step of awarding a prize to the player if the game play decision is a statistically best game play decision.

14. The method of claim 1, wherein step (d) also includes the step of immediately ending the game if the game play decision is not a statistically best game play decision.

15. The method of claim 1, further comprising the step of continuing to play the event to the conclusion of the event.

16. The method of claim 15, further comprising the step of awarding an additional prize awarded to the player at the conclusion of the event; the additional prize being determined by the result of the continuation of play.

17. The method of claim 6, wherein step (e) includes the step of ending the game prior to the natural conclusion of the game.

18. The method of claim 11, further comprising the step of providing a preview button that initiates step (a).

19. The method of claim 11, further comprising the step of disclosing the value of the prize that will be played for if the player pays to play the game.

* * * * *

UNITED STATES PATENT AND TRADEMARK OFFICE

CERTIFICATE OF CORRECTION

PATENT NO. : 8,491,369 B2
APPLICATION NO. : 11/696185
DATED : July 23, 2013
INVENTOR(S) : Kowell It is certified that error appears in the above-identified patent and that said Letters Patent is hereby corrected as shown below:

In the Claims

Column 5, line 40, Claim 1, delete “awarded”

Signed and Sealed this
Twenty-fourth Day of September, 2013

Teresa Stanek Rea
*Deputy Director of the United States Patent and Trademark Office*